(No Model.)

S. H. RAYMOND.
JOURNAL BEARING.

No. 531,748. Patented Jan. 1, 1895.

WITNESSES:
Lewis E. Flanders
Lois Moulton

INVENTOR
Silas H. Raymond
BY
Luther V. Moulton
ATTORNEY.

UNITED STATES PATENT OFFICE.

SILAS H. RAYMOND, OF GRAND RAPIDS, MICHIGAN.

JOURNAL-BEARING.

SPECIFICATION forming part of Letters Patent No. 531,748, dated January 1, 1895.

Application filed March 26, 1894. Serial No. 505,228. (No model.)

*To all whom it may concern:*

Be it known that I, SILAS H. RAYMOND, a citizen of the United States, residing at Grand Rapids, in the county of Kent and State of Michigan, have invented certain new and useful Improvements in Journal-Bearings; and I do hereby declare the following to be a full, clear, and exact description of the invention, such as will enable others skilled in the art to which it appertains to make and use the same.

My invention relates to improvements in journal bearings, and its object is to provide the same with certain new and useful features, hereinafter more fully described and particularly pointed out in the claims, reference being had to the accompanying drawings, in which—

Figure 2:
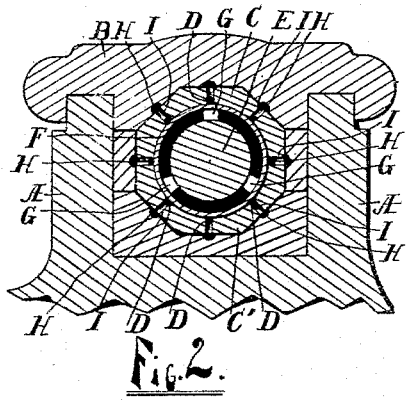
Figure 1:
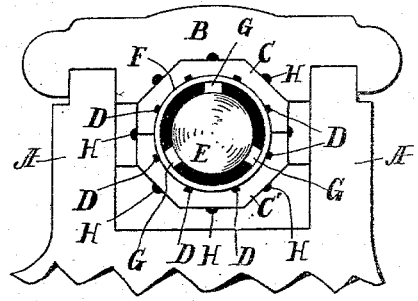
Figure 3:
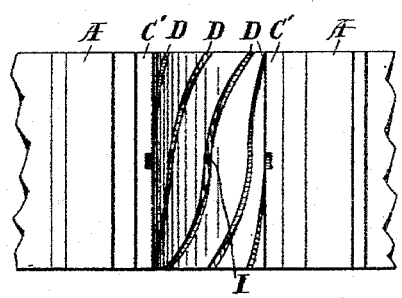
Figure 5:
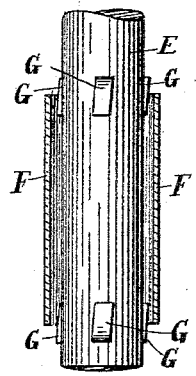
Figure 4:
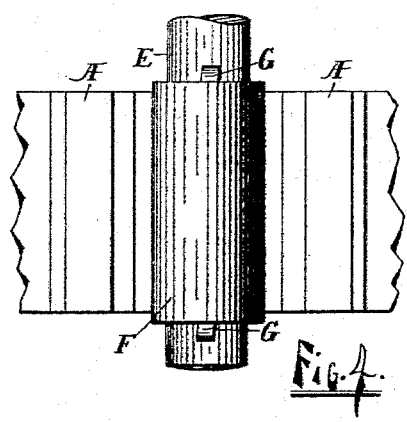
Figure 6:
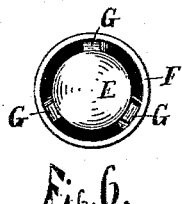

Figure 1 is a side elevation of a device embodying my invention; Fig. 2, a transverse vertical section of the same; Fig. 3, a plan of the same, with the cap, upper half of bearing and shaft and sleeve removed. Fig. 4 is the same showing shaft and sleeve in place. Fig. 5 is a detail, showing shaft with sleeve in section; and Fig. 6 an end view of the shaft with its sleeve.

Like letters refer to like parts in all of the figures.

A, A, are the jaws of the engine frame, which embrace the pillow block.

B is the cap; C, the upper half of the bearing, and C' the lower half of same.

D are spiral grooves, or channels in the inner wall of the divided bearing, which allow the circulation of air, and also carry off any particles of dirt that may get into the bearing.

E is the shaft around which is the sleeve F, held concentric thereto by the spirally arranged ribs G, which ribs extend beyond the end of the sleeve and serve as fans to catch the air and circulate it through said sleeve. Outside of the bearings C, C' are channels H, and said channels are connected with the spiral grooves D by the duct I. The sleeve F being secured to the shaft by the ribs G, receives the friction, and as the said sleeve and shaft turn the ribs G being set spirally, cause the air to circulate through the sleeve F and thus prevent heating of the same. The spiral channels D in the bearing, not only carry away all dirt, &c., that may get between said sleeve and bearing, but also prevent heating of the sleeve by allowing the circulation of air. The air passages H—I, also help to keep the journal cool.

I do not limit myself to the particular form of bearing shown but my invention may be applied to various forms of shafts and bearings, the essential features being the provision of a thin metallic bearing surface to the shaft and passages for air circulation over its inner surface whereby it is cooled by said air passages and channels in the bearing surfaces upon which the shaft turns, whereby air currents are used to cool the same.

What I claim is—

1. In a journal bearing, the combination of a journal, a bearing for said journal, there being spiral grooves in said bearing, ducts or channels outside said bearing, and short ducts connecting said spiral grooves and said channels, substantially as described.

2. In a journal bearing the combination of a shaft, a sleeve around said shaft, ribs connecting said shaft and sleeve, and a bearing for said sleeve, substantially as described.

3. In a journal bearing, the combination of a shaft, a sleeve around said shaft spirally arranged ribs having their outer ends extending beyond the end of the sleeve and rigidly securing said sleeve to said shaft, and a bearing for said sleeve, substantially as described.

4. In a journal bearing, in combination a shaft, a sleeve around said shaft spirally arranged ribs connecting said sleeve and shaft, and extending outside said sleeve, a bearing for said sleeve, there being spiral grooves in said bearing, channels outside said bearing, and ducts connecting said spiral grooves and channels, substantially as described.

5. The combination of the journal, and a sleeve rotating with said journal and encircling the same, said journal and sleeve being so located with respect to each other that an air space open to the atmosphere will be left between them, substantially as described.

6. The combination with the journal and its encircling sleeve so located with respect to each other as to leave an air space between them, of a bearing for said sleeve, said bearing having air passages open to the atmosphere, substantially as described.

In testimony whereof I affix my signature in presence of two witnesses.

SILAS H. RAYMOND.

Witnesses:
LUTHER V. MOULTON,
LOIS MOULTON.